United States Patent
Wang et al.

(10) Patent No.: US 9,766,761 B2
(45) Date of Patent: Sep. 19, 2017

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Lei Wang, Beijing (CN); Hailin Xue, Beijing (CN); Yanna Xue, Beijing (CN); Hongjuan Liu, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/647,907

(22) PCT Filed: Sep. 18, 2014

(86) PCT No.: PCT/CN2014/086813
§ 371 (c)(1),
(2) Date: May 28, 2015

(87) PCT Pub. No.: WO2015/180303
PCT Pub. Date: Dec. 3, 2015

(65) Prior Publication Data
US 2016/0246408 A1    Aug. 25, 2016

(30) Foreign Application Priority Data

May 30, 2014  (CN) .......................... 2014 1 0239897

(51) Int. Cl.
G06F 3/044        (2006.01)
G02F 1/1333       (2006.01)
G06F 3/041        (2006.01)

(52) U.S. Cl.
CPC .......... *G06F 3/044* (2013.01); *G02F 1/13338* (2013.01); *G06F 3/0412* (2013.01); *G06F 3/0416* (2013.01)

(58) Field of Classification Search
CPC ................... G06F 3/0412; G06F 3/044; G06F 2203/04103; G06F 3/041; G06F 3/0416;
(Continued)

(56) References Cited

U.S. PATENT DOCUMENTS 7,859,521 B2 * 12/2010 Hotelling .............. G06F 3/0412
178/18.03
8,901,944 B2 * 12/2014 Chai ....................... G06F 3/044
324/658

(Continued)

FOREIGN PATENT DOCUMENTS

CN        102314248 A      1/2012
CN        102841718 A     12/2012
(Continued)

OTHER PUBLICATIONS

International Search Report and Written Opinion both dated Feb. 26, 2015; PCT/CN2014/086813.
(Continued)

*Primary Examiner* — Dmitriy Bolotin
(74) *Attorney, Agent, or Firm* — Ladas & Parry LLP (57) ABSTRACT

An in-cell touch panel and a display device are disclosed. The in-cell touch panel includes a top substrate and a bottom substrate disposed oppositely to each other, a common electrode layer disposed on a side of the bottom substrate that faces the top substrate, and a touch sensing chip. The (Continued)

common electrode layer includes a plurality of independent self-capacitance electrodes. The touch sensing chip is configured to apply common electrode signals to self-capacitance electrodes in a display interval and determine touch positions by detecting capacitance value variation of self-capacitance electrodes in a touch interval. No additional process is added in the manufacturing process of the array substrate for the in-cell touch panel, thereby saving production costs and improving production efficiency.

17 Claims, 7 Drawing Sheets

(58) Field of Classification Search
CPC ... G06F 2203/0411; G06F 2203/04112; G02F 1/13338; G02F 1/133345; G02F 1/133512; G02F 1/13439; G02F 1/136286; G02F 1/1368; G02F 2001/134345; G09G 2300/0809; G09G 2310/0202; G09G 3/3677; G09G 3/3688
USPC .......... 345/173, 174, 55, 90; 178/18.03; 349/12; 445/24
See application file for complete search history.

(56) References Cited

U.S. PATENT DOCUMENTS

| | | | |
|---|---|---|---|
| 8,970,537 B1* | 3/2015 | Shepelev | G06F 3/044 178/18.01 |
| 2010/0194697 A1* | 8/2010 | Hotelling | G06F 3/0412 345/173 |
| 2010/0194699 A1* | 8/2010 | Chang | G06F 3/044 345/173 |
| 2010/0214247 A1 | 8/2010 | Tang et al. | |
| 2010/0214260 A1 | 8/2010 | Tanaka et al. | |
| 2011/0096025 A1 | 4/2011 | Slobodin et al. | |
| 2012/0044171 A1 | 2/2012 | Lee et al. | |
| 2014/0028616 A1 | 1/2014 | Furutani et al. | |
| 2014/0055412 A1 | 2/2014 | Teramoto | |
| 2014/0104510 A1 | 4/2014 | Wang et al. | |
| 2014/0132560 A1 | 5/2014 | Huang et al. | |
| 2014/0146013 A1 | 5/2014 | Noguchi et al. | |
| 2014/0176465 A1 | 6/2014 | Ma et al. | |
| 2014/0313158 A1 | 10/2014 | Mo et al. | |
| 2014/0320767 A1 | 10/2014 | Xu et al. | |
| 2014/0327654 A1 | 11/2014 | Sugita et al. | |
| 2014/0362031 A1 | 12/2014 | Mo et al. | |
| 2015/0091847 A1 | 4/2015 | Chang | |
| 2015/0277655 A1* | 10/2015 | Kim | G06F 3/0412 345/174 |
| 2015/0293639 A1 | 10/2015 | Furutani et al. | |
| 2016/0004361 A1 | 1/2016 | Maharyta | |
| 2016/0018922 A1 | 1/2016 | Wang et al. | |
| 2016/0026330 A1 | 1/2016 | Shepelev et al. | |
| 2016/0048233 A1* | 2/2016 | Wang | G06F 3/0412 345/174 |
| 2016/0170534 A1 | 6/2016 | Chang et al. | |
| 2016/0195962 A1 | 7/2016 | Miyazaki et al. | |
| 2016/0306454 A1* | 10/2016 | Wang | G06F 3/0412 |

FOREIGN PATENT DOCUMENTS

| | | |
|---|---|---|
| CN | 102955635 A | 3/2013 |
| CN | 202854779 U | 4/2013 |
| CN | 202887154 U | 4/2013 |
| CN | 103279245 U | 6/2013 |
| CN | 202976049 U | 6/2013 |
| CN | 103186307 A | 7/2013 |
| CN | 103279245 A | 9/2013 |
| CN | 103293785 A | 9/2013 |
| CN | 103383612 A | 11/2013 |
| CN | 103472961 A | 12/2013 |
| CN | 103677454 A | 3/2014 |
| CN | 103793120 A | 5/2014 |
| CN | 203606816 U | 5/2014 |
| CN | 104020891 A | 9/2014 |
| CN | 104020893 A | 9/2014 |
| CN | 104020906 A | 9/2014 |
| CN | 104020907 A | 9/2014 |
| CN | 104020909 A | 9/2014 |
| CN | 104020910 A | 9/2014 |
| CN | 104020912 A | 9/2014 |
| CN | 104035540 A | 9/2014 |
| CN | 104035640 A | 9/2014 |
| EP | 2720124 A2 | 4/2014 |
| TW | 201117032 A | 5/2011 |
| TW | 201413558 A | 4/2014 |

OTHER PUBLICATIONS

First Chinese Office Action dated Jun. 23, 2016; Appln. No. 201410239897.3.
International Search Report and Written Opinion dated Mar. 2, 2015; PCT/CN2014/087005.
International Search Report and Written Opinion dated Feb. 26, 2015; PCT/CN2014/087007.
First Chinese Office Action dated May 30, 2016: Appln. No. 201410239900.1.
First Chinese Office Action dated Jul. 4, 2016; Appln. No. 201410241132.3.
USPTO NFOA dated Jul. 28, 2016 in connection with U.S. Appl. No. 14/443,286.
USPTO NFOA dated Oct. 6, 2016 in connection with U.S. Appl. No. 14/443,594.
Second Chinese Office Action dated Nov. 18, 2016; Appln. No. 201410241132.3.
USPTO FOA dated Dec. 20, 2016 in connection with U.S. Appl. No. 14/443,286.
Second Chinese Office Action dated Dec. 16, 2016; Appln. No. 201410239897.3.
USPTO FOA dated Apr. 7, 2017 in connection with U.S. Appl. No. 14/443,594.
The Third Chinese Office Action dated Jun. 5, 2017, Appln. No. 201410239897.3.

* cited by examiner

IN-CELL TOUCH PANEL AND DISPLAY DEVICE

TECHNICAL FIELD

At least one embodiment of the present invention relates to an in-cell touch screen and a display device.

BACKGROUND

With the fast development of display technology, touch screen panels have become popular in people's life gradually. At present, according to constitution structures, touch screens may be classified into add-on mode touch panels, on-cell touch panels and in-cell touch panels. For an add-on mode touch panel, the touch panel and the liquid crystal display (LCD) are produced separately and then attached together to form a liquid crystal display with touch function. Add-on mode touch panels suffer disadvantages such as high manufacturing cost, low light transmission rate and thick assembly. For an in-cell touch panel, touch electrodes of the touch panel are embedded inside the liquid crystal display, which can reduce the overall thickness of the module, and can drastically reduce manufacturing costs of the touch panel. Therefore, in-cell touch panels have received great attentions from panel manufacturers.

At present, an in-cell touch panel detects the touch position of a finger in accordance with the mutual capacitance or self-capacitance principle. For the self-capacitance principle, it is possible to provide a plurality of self-capacitance electrodes disposed in the same layer and insulated from each other in the touch panel. When a human body does not touch the screen, each self-capacitance electrode experiences capacitance at a fixed value. When a human body touches the screen, respective self-capacitance electrodes experience capacitance that is at a value of the fixed value plus the body capacitance. The touch sensing chip can determine the touch position by detecting capacitance value variation of self-capacitance electrodes in the touch peirod. Since the body capacitance can act on all the self-capacitances, as compared to the approach in which the body capacity that can only act on projection capacitance in accordance with mutual capacitance principle, the touch variation caused by the touch of a body on the screen would be greater than that of the touch panel manufactured in accordance with the mutual capacitance principle.

SUMMARY

At least one embodiment of the present invention provides an in-cell touch panel and a display device to reduce production costs of in-cell touch panels and improve production efficiency.

At least one embodiment of the present invention provides an in-cell touch panel including: a top substrate and a bottom substrate disposed oppositely to each other, a common electrode layer disposed on a side of the bottom substrate that faces the top substrate, and a touch sensing chip. The common electrode layer consists of a plurality of independent self-capacitance electrodes; the touch sensing chip is configured to apply common electrode signals to self-capacitance electrodes in a display interval and determine a touch position by detecting capacitance value variation of self-capacitance electrodes in a touch interval.

At least one embodiment of the present invention provides a display device including the above-mentioned in-cell touch panel provided in embodiments of the present invention.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

The inventors of the present invention have noted that in the structure design of capacitive in-cell touch panels, extra layers should be added inside display panels, leading to added new processes while manufacturing panels, increased production costs, which is adverse to increase of production efficiency.

At present, liquid crystal display technologies capable of realizing wide viewing angle mainly include In-Plane Switch (IPS) technology and Advanced Super Dimension Switch (ADS) technology. In the ADS technology, a multi-dimensional electric field is formed with both an electric field produced at edges of slit electrodes on the same plane and an electric field produced between a slit electrode layer and a plate electrode layer, so that liquid crystal molecules at all orientations, which are located directly above the electrodes and between the slit electrodes in a liquid crystal cell, can be rotated, which enhances the work efficiency of liquid crystals and increases light transmittance. The Advanced-Super Dimensional Switching technology can improve the picture quality of TFT-LCDs and has advantages of high resolution, high transmissivity, low power dissipation, wide viewing angles, high opening ratio, low chromatic aberration, and no push Mura, etc.

Embodiments of the present invention propose a novel capacitive in-cell touch panel structure based on the traditional ADS technology and an improvement of ADS technology, namely H-ADS (high aperture ratio advanced super dimension switching).

Specific implementations of the in-cell touch panel and display device provided in embodiments of the present invention will be described in detail below with reference to accompanying drawings.

Thicknesses and shapes of layers in the accompanying drawings do not reflect real scale, and only serve to illustrate contents of the present invention.

Figure 1:
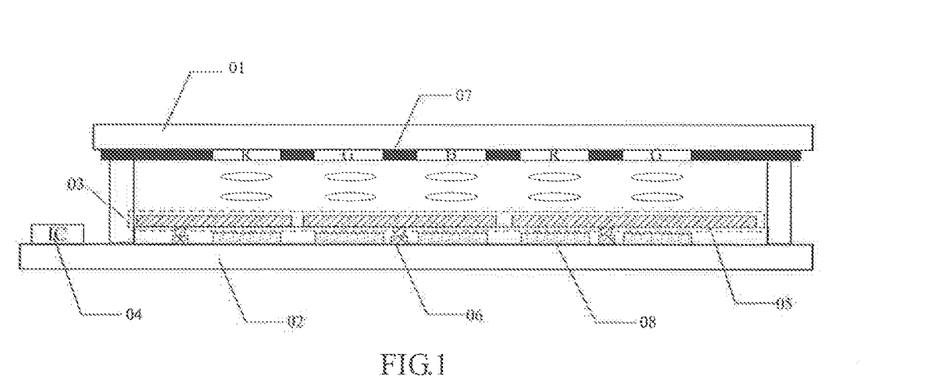
FIG. 1 is a structural view of an in-cell touch panel provided in an embodiment of the present invention.

At least one embodiment of the present invention provides an in-cell touch panel as shown in FIG. 1, including a top substrate 01 and a bottom substrate 02 disposed oppositely to each other, a common electrode layer 03 disposed on a side of the bottom substrate 02, which side faces the top substrate 01, and a touch sensing chip 04.

Figure 2:
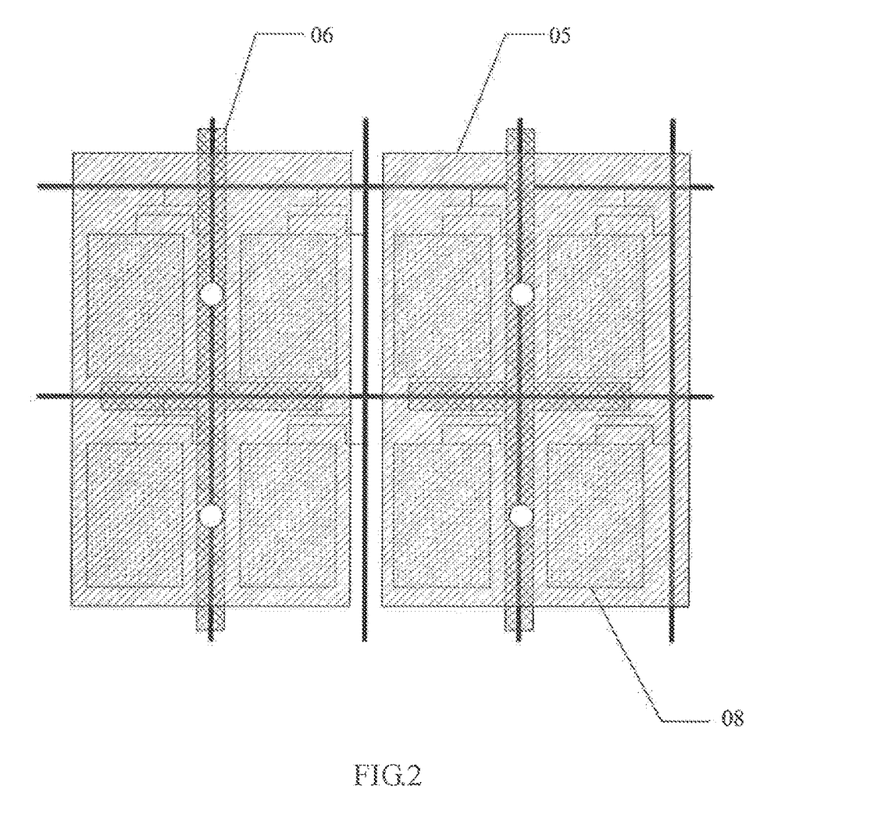
FIG. 2 is a top structural view of an in-cell touch panel provided in an embodiment of the present invention.

As shown in FIG. 2, the common electrode layer 03 comprises a plurality of independent self-capacitance electrodes 05. The touch sensing chip 04 is configured to apply common electrode signals to self-capacitance electrodes 05 in a display interval and determine touch positions by detecting capacitance value variation of self-capacitance electrodes 05 in a touch interval.

For the above-mentioned in-cell touch panel provided in embodiments of the present invention, the common electrode layer 03 is reused/multiplexed as self-capacitance electrodes 05 in accordance with the self-capacitance principle by modifying the pattern of the common electrode layer 03 to partition it into a plurality of independent self-capacitance electrodes 05. The touch sensing chip 04 determines the touch position by detecting capacitance value variation of self-capacitance electrodes 5 in the touch period. Because for the touch panel provided in embodiments of the present invention, the structure of the common electrode layer 03 is modified to partition it into self-capacitance electrodes 05, no additional process is added in the manufacturing process of an array substrate, thereby saving production costs and improving production efficiency.

Because the above-mentioned touch panel provided in embodiments of the present invention reuses the common electrode layer 03 as self-capacitance electrodes 05, in order to reduce mutual interference between display and touch signals, in one embodiment, a time-division driving mode can be used for touch and display intervals. Furthermore, in one embodiment, it is also possible to integrate a display driving chip and a touch sensing chip into one chip to further reduce the production costs.

Figure 3A:
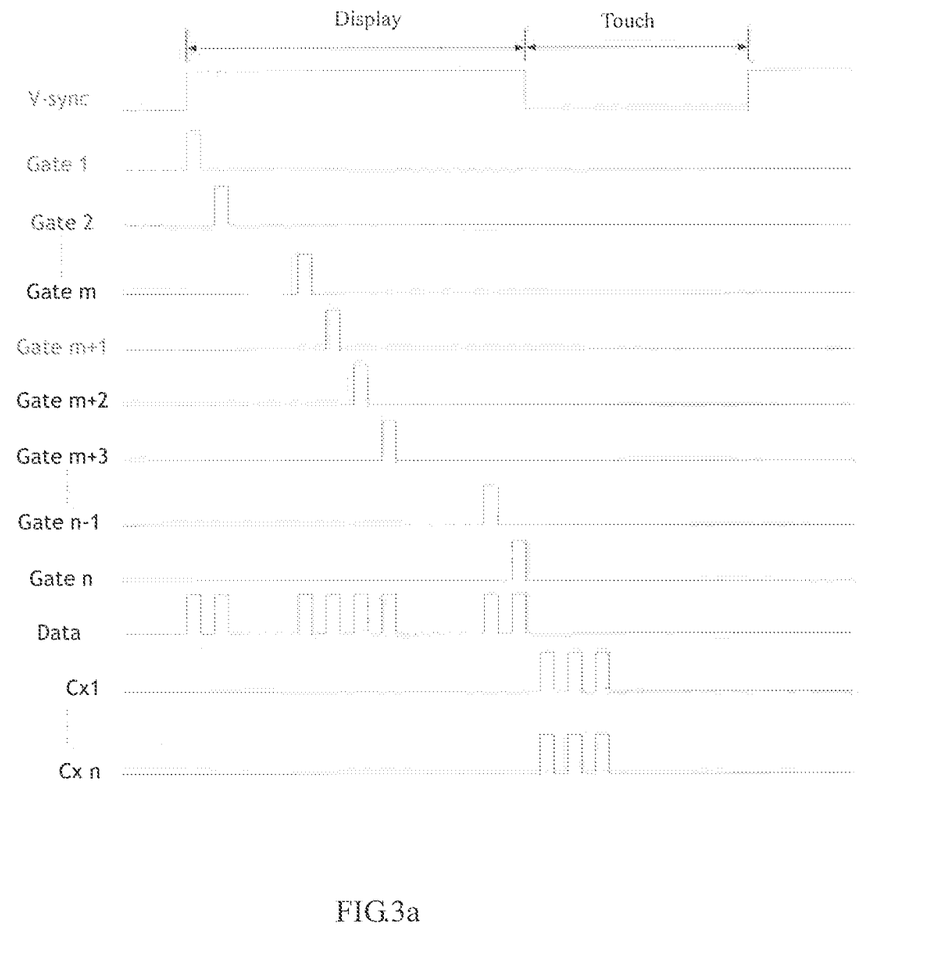
FIGS. 3a and 3b are driving time sequence diagrams of an in-cell touch panel provided in an embodiment of the present invention.
Figure 3B:
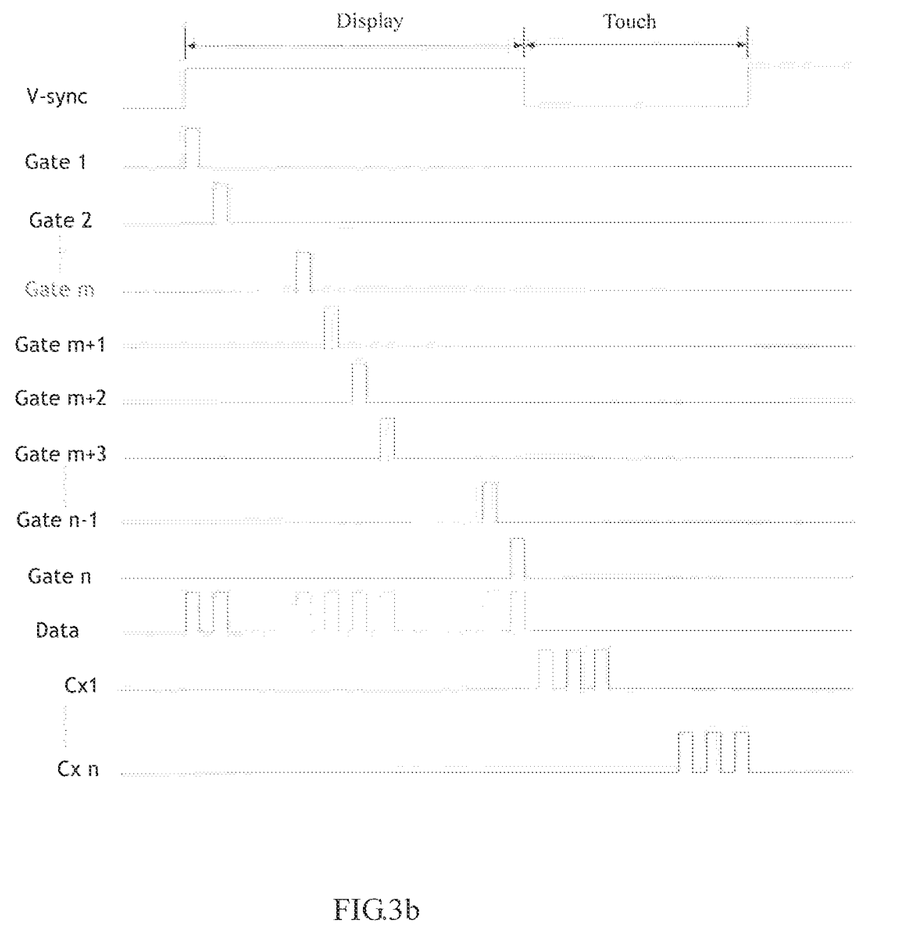

For example, in the driving timing sequence diagram shown in FIGS. 3a and 3b, the time period for the touch panel to display each frame (V-sync) is divided into a display interval and a touch interval. For example, in the driving timing sequence diagram shown in FIGS. 3a and 3b, the time period for the touch panel to display one frame is 16.7 ms in which 5 ms is selected as a touch interval and the rest 11.7 ms as a display interval. Of course it is also possible to appropriately adjust durations of both according to the processing capacity of IC chips, which is not specifically limited here. In the display interval (Display), each gate signal line Gate 1, Gate 2 . . . Gate n in the touch panel is applied with gate scanning signals successively, data signal lines Data is applied with gray scale signals, and the touch sensing chip connected with self-capacitance electrodes Cx 1 . . . Cx n applies common electrode signals to self-capacitance electrodes Cx 1 . . . Cx n respectively to implement liquid crystal display function. In the touch interval, as shown in FIG. 3a, the touch sensing chip connected with self-capacitance electrodes Cx 1 . . . Cx n can apply driving signals to self-capacitance electrodes Cx 1 . . . Cx n at the same time, and receives feedback signals of self-capacitance electrodes Cx 1 . . . Cx n at the same time. Alternatively, as shown in FIG. 3b, the touch sensing chip connected with self-capacitance electrodes Cx 1 . . . Cx n can apply driving signals to self-capacitance electrodes Cx 1 . . . Cx n successively, and receives feedback signals of self-capacitance electrodes Cx 1 . . . Cx n respectively, which is not limited herein. Touch function is implemented by analyzing feedback signals to determine whether any touch occurs.

While designing touch panel with self-capacitance principle, as shown in FIG. 2, in one embodiment, each self-capacitance electrode 05 generally is connected with the touch sensing chip 04 via a separate wire 06, that is, the touch panel generally further includes a plurality of wires 06 for connecting self-capacitance electrodes 05 to the touch sensing chip 04.

In specific implementations, it is possible to dispose patterns of wires 06 and self-capacitance electrodes 05 on the same layer, namely, dispose patterns of self-capacitance electrodes 05 and wires 06 in the common electrode layer 03. It is also possible to dispose patterns of wires 06 and self-capacitance electrodes 05 in different layers, that is, fabricate patterns of wires 06 in separate patterning process. Disposing wires 06 and self-capacitance electrodes 05 on the same layer may avoid adding new patterning process. However, disposing self-capacitance electrodes 05 and wires 06 on the same layer will form a touch dead zone, in which wires 06 connected with a plurality of self-capacitance electrodes 05 all pass this touch dead zone. Therefore, in the touch dead zones, signals are relatively disorder, that is, touch performance in the region can not be guaranteed. Based on the above-mentioned consideration, in one embodiment, it is possible to dispose wires 06 and self-capacitance electrodes 05 on different layers.

The resolution for touch panel is generally on the order of millimeter. Therefore, in specific implementations, it is possible to choose density of and the area occupied by self-capacitance electrodes 05 according to the required touch resolution to ensure the required touch density. Generally, self-capacitance electrodes 05 are designed as square electrodes of 5 mm*5 mm. A resolution for display screen is generally on the order of microns, therefore one self-capacitance electrode 05 generally may correspond to a plurality of pixels in the display screen. In the above-mentioned in-cell touch panel provided in an embodiment of the present invention, the common electrode layer 03 disposed in its entirety on the bottom substrate 02 is partitioned into a plurality of self-capacitance electrodes 05, and in order not to influence normal display function, while partitioning the common electrode layer 03, partition lines are generally kept clear of opening regions for display and disposed in regions corresponding to the pattern of black matrix layer.

For example, as shown in FIG. 1, the above-mentioned touch panel provided in an embodiment of the present invention may further include a black matrix layer 07 disposed on a side of the top substrate 01, which side faces the bottom substrate 02, or on a side of the bottom substrate 02, which side faces the top substrate 01. Orthogonal projections of partitioning gaps between adjacent two self-capacitance electrodes 05 on the bottom substrate 02 are all within regions in which the pattern of black matrix layer 07 is located. Orthogonal projections of patterns of wires 06 on the bottom substrate 02 are all within regions in which the pattern of black matrix layer 07 is located.

In the above-mentioned touch panel provided in one embodiment of the present invention, as shown in FIG. 1, a pixel electrode layer 08 disposed on different layer from the common electrode layer 03 may be further provided on a side of the bottom substrate 02 that faces the top substrate 01. Generally, on the bottom substrate 02 in an ADS type liquid crystal panel, a common electrode layer 03 is located on the lower layer as a plate electrode (closer to the base substrate), a pixel electrode layer 08 is located on the upper layer as slit electrodes (closer to the liquid crystal layer), and an insulating layer is provided between the pixel electrode layer and the common electrode layer 03. While on the array substrate in a H-ADS type liquid crystal panel, a pixel electrode layer 08 is located on the lower layer as plate electrodes (closer to the base substrate), a common electrode layer 03 is located on the upper layer as a slit electrode (closer to the liquid crystal layer), and an insulating layer is provided between the pixel electrode layer 08 and the common electrode layer 03.

In a different embodiment, according to the mode of the liquid crystal display panel to which the above-mentioned touch panel is applied, the self-capacitance electrodes 05 forming the common electrode layer 03 may have a slit-like ITO electrode structure or a plate ITO electrode structure at the locations corresponding to opening regions of pixels, that is, in the H-ADS mode, self-capacitance electrodes 05 may include slit-like ITO electrodes. For example, the slit-like ITO electrode structure is an ITO electrode having slits in opening regions of pixels. In case of an ADS mode, the self-capacitance electrodes 05 may include plate ITO electrodes to satisfy requirements for liquid crystal display. In this case self-capacitance electrodes 05 may interact with human electric field through the slit regions of the pixel electrode layer 08. Since the structure known by those skilled in the art may be adopted for liquid crystal panels in ADS and H-ADS modes, they will not be described in detail any more here.

In one embodiment, In order to increase variations caused by self-capacitance electrodes 05 sensing body capacitance in the touch interval, it is possible to dispose the common electrode layer 03 formed of self-capacitance electrodes 05 over the pixel electrode layer 08 on the bottom substrate 02, that is, an H-ADS mode is adopted, to make the self-capacitance electrode 05 as close to the top substrate 01 as possible.

And in specific implementations, it is possible to adopt any patterning flow to manufacture layers on the bottom substrate 02. For example, eight (8) patterning processes may be used: gate and gate line patterning→active layer patterning→first insulating layer patterning→data line and source/drain patterning→resin layer patterning→pixel electrode layer patterning→second insulating layer patterning-→common electrode layer patterning. Of course, seven (7) patterning processes, six (6) or five (5) patterning processes may also be used according to practical designs, which is not limited herein.

In a different embodiment, whether applied in an ADS mode or an H-ADS mode, the layer on which wires 06 connected with self-capacitance electrodes 05 in the common electrode layer 03 are located may be disposed between the pixel electrode layer 08 and the common electrode layer 03, that is, the insulating layer between the pixel electrode layer 08 and the common electrode layer 03 is used to isolate wires 06 and self-capacitance electrodes 05 without any connection relationship. For example, it is possible to use via holes in the insulating layer to connect corresponding wires 06 and self-capacitance electrodes 05. For example, when the pixel electrode layer 08 is located below the common electrode layer 03, patterns of wires 06 are manufactured after completing the pattern of the pixel electrode layer 08, and then patterns of insulating layer and common electrode layer 03 are manufactured successively. For example, patterns of wires 06 may be set as a transverse strip structure or a longitudinal strip structure or a crossing mesh structure, as shown in FIG. 2. Patterns of wires 06 may be designed according to actual parameters, which are not limited herein.

Figure 4:
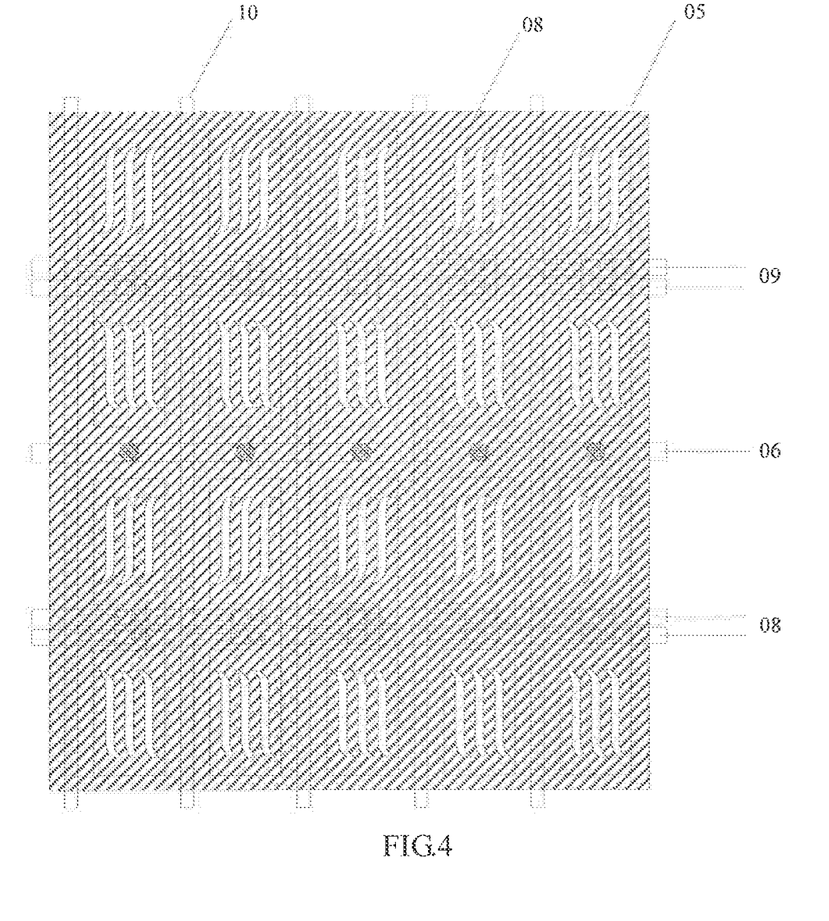
FIGS. 4 and 5 are top structural views of an in-cell touch panel provided in an embodiment of the present invention respectively.
Figure 5:
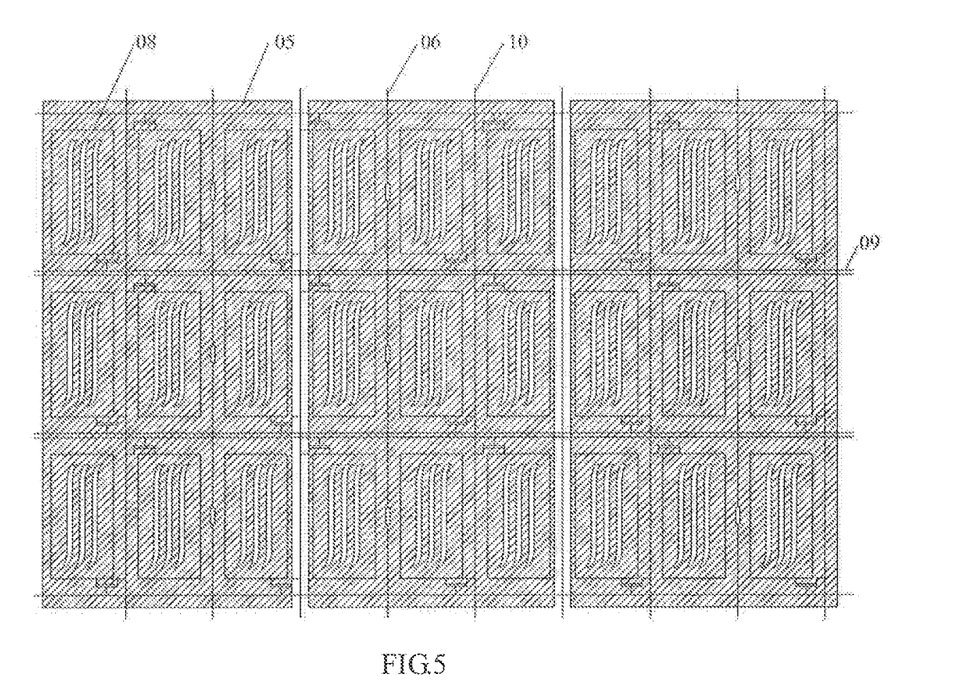

As shown in FIGS. 4 and 5, in the above-mentioned touch panel provided in a different embodiment of the present invention, it may further include gate signal lines 09 and data signal lines 10 intersecting each other and disposed on a side of the bottom substrate 02 that faces the top substrate 01; adjacent two gate signal lines 09 and data signal lines 10 enclose a pixel. In order to facilitate connecting self-capacitance electrodes 05 and the touch sensing chip 04 through wires 06, the extension direction of wires 06 may be configured to be the same as that of the gate signal lines 09 or the data signal lines 10. That is, the extension directions of wires 06 may be consistent.

In the touch panel provided in a different embodiment of the present invention, in order not to add any new layer as much as possible, and in order to guarantee production efficiency and reduce the production costs, in specific implementations, it is possible to dispose wires 06 connected with self-capacitance electrodes 05 on the same layer as the gate signal lines 09 or on the same layer as the data signal lines 10.

As shown in FIG. 4, one possible implementation may be as follows: on the bottom substrate 02, taking every two adjacent rows of pixels as one pixel group, two gate signal lines 09 are provided between these two rows of pixels for providing gate scanning signals to the two rows of pixels. It is possible to save the position of the gate signal line 09 originally between adjacent pixel groups by changing positions of gate signal lines 09 and TFTs between two adjacent rows of pixels. Thus, as shown in FIG. 4, it is possible to dispose wires 06 at gaps between adjacent pixel groups and on the same layer as the gate signal lines 09. For example, wires 06 are electrically connected with corresponding self-capacitance electrodes 05 through via holes.

For example, another possible implementation may be as follows. As shown in FIG. 5, a dual-gate structure is adopted in which on the bottom substrate 02, two gate signal lines 09 are provided between adjacent rows of pixels and every two adjacent columns of pixels are set as one pixel group and share the data signal line 10 between these two columns of pixels. By doubling the number of gate signal lines 09, it is possible to save the position for the data signal line 10 originally between adjacent pixel groups. Thus, as shown in FIG. 5, it is possible to dispose wires 06 at gaps between adjacent pixel groups and on the same layer as data signal line 10. For example, wires 06 are electrically connected with corresponding self-capacitance electrodes 05 through via holes.

Figure 6:
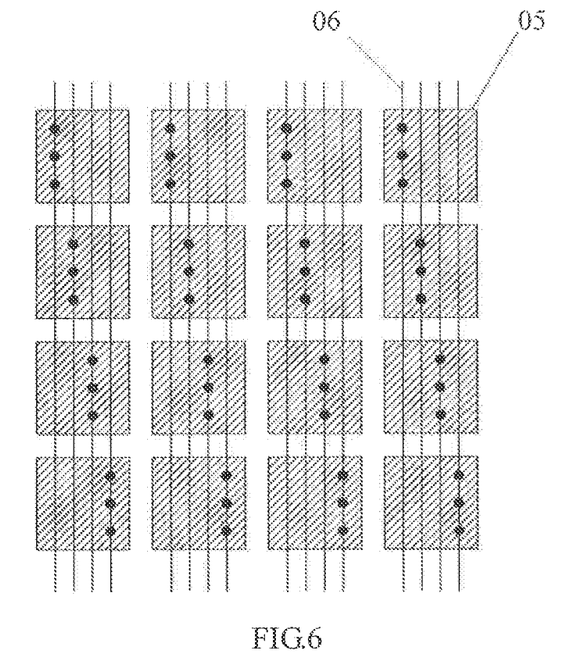
FIGS. 6 and 7 are top structural views of an in-cell touch panel provided in an embodiment of the present invention respectively.

In one embodiment, since the common electrode layer is generally made of ITO material while ITO material has high resistance, in order to reduce its resistance to the largest extent and improve signal-to-noise ratio for the self-capacitance electrodes 05 to transmit electrical signals, it is possible to electrically connect self-capacitance electrodes 05 with corresponding wires 06 through a plurality of via holes, as shown in FIG. 6. This is equivalent to connecting the ITO electrodes in parallel with metallic resistors made of the wires and can reduce the resistance of electrodes to the large extent, thereby improving signal to noise ratio of transmitting signals by electrodes.

Figure 7:
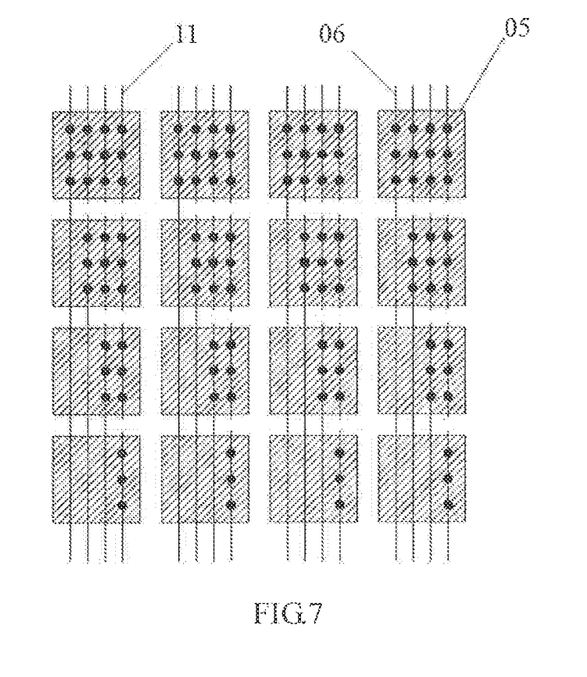

In one embodiment, in order to further reduce the resistance of self-capacitance electrodes 05, while designing wires 06, as shown in FIG. 7, in the condition where wires 06 are electrically connected with corresponding self-capacitance electrodes 05, it is also possible to break the wires originally extending throughout the entire panel into wires 06 and a plurality of metal wires 11 disposed on the same layer as and insulated from wires 06. A metal wire 11 and a corresponding wire 06 are in the same straight line and are connected in parallel with an overlapping self-capacitance electrode 05, for example, electrically connected with this electrode through a via hole. The above-mentioned design can take full advantage of gaps between adjacent groups of pixels to dispose metal wires with low resistance value utilizing the redundant parts of wires while guaranteeing the aperture ratio of touch panel, and connect metal wires of low resistance value with self-capacitance electrodes of high resistance value in parallel, thereby reducing resistance of self-capacitance electrodes to a large extent.

In the in-cell touch panel provided in an embodiment of the present invention, since body capacitance acts on the self-capacitance of self-capacitance electrodes 05 through direct coupling, when a human body touches the screen, only the self-capacitance electrode 05 under the touch positions will experience a large capacitance value variation, while self-capacitance electrodes 05 adjacent the self-capacitance electrodes 05 under the touch positions will experience very small capacitance value variations. Thus, when for example a finger slides on the touch panel, it is difficult to determine the touch coordinates in regions in which self-capacitance electrodes 05 are located. Therefore, in the above-mentioned in-cell touch panel provided in embodiments of the present invention, it is possible to configure opposite sides of adjacent two self-capacitance electrodes 05 as bend lines/zigzag lines so as to increase capacitance value variation of self-capacitance electrodes 05 adjacent to the self-capacitance electrode 05 under the touch position.

Upon specific implementations, it is possible to set the overall shape of self-capacitance electrodes 05 in one of or combination of the following ways.

Figure 8A:
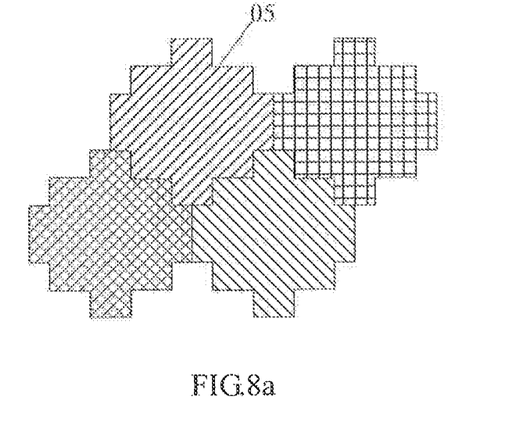
FIGS. 8a and 8b are structural views showing adjacent self-capacitance electrodes having opposite sides configured as bend lines in the in-cell touch panel provided in an embodiment of the present invention respectively.

It is possible to configure opposite sides of two adjacent self-capacitance electrodes 05 that are bend lines as step-like structures such that two step-like structures have consistent and matching structural shapes as shown in FIG. 8a that shows 2*2 self-capacitance electrodes 05.

Figure 8B:
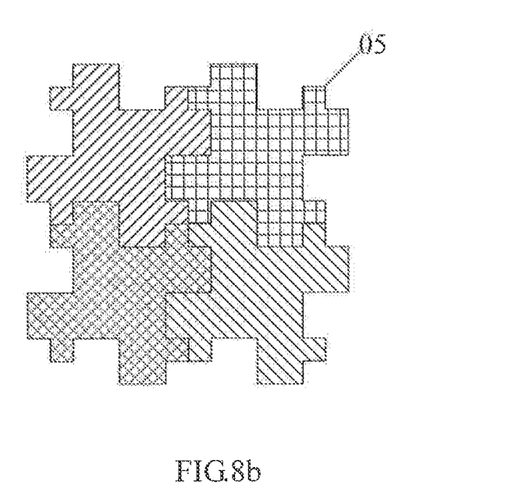

It is possible to configure opposite sides of two adjacent self-capacitance electrodes 05 that are bend lines as concave-convex structures such that two concave-convex structures have consistent and matching structural shapes as shown in FIG. 8b that shows 2*2 self-capacitance electrodes 05.

Based on the same inventive concept, at least one embodiment of the present invention further provides a display device including the above-mentioned in-cell touch panel provided in any embodiment of the present invention. The display device may be any product or component having display function such as a cellphone, a tablet computer, a TV set, a display, a notebook computer, a digital picture frame and a navigator. The above-mentioned embodiments of the in-cell touch panel may be referred to for implementations of the display device and repetitions will not be described any more.

For the above-mentioned in-cell touch panel and the display device provided in an embodiment of the present invention, the common electrode layer is reused/multiplexed as self-capacitance electrodes in accordance with self-capacitance principle by modifying the pattern of the common electrode layer to partition it into a plurality of independent self-capacitance electrodes. The touch sensing chip can determine the touch position by detecting capacitance value variation of self-capacitance electrodes in the touch period. Since for the touch panel provided in an embodiment of the present invention, the structure of the common electrode layer is modified to partition it into self-capacitance electrodes, no additional process is added in the manufacturing process of array substrate, thereby saving production costs and improving production efficiency.

It is understood that one skilled in the art can make various modifications and variations to the present invention without departing from the spirit and scope of the present invention. Thus, if these modifications and variations of the present invention fall within the scope of claims and their equivalents of the present invention, it is intended that the present invention contains these modifications and variations.

The present application claims priority of China Patent application No. 201410239897.3 filed on May 30, 2014, the content of which is incorporated in its entirety as part of the present application by reference herein.

The invention claimed is:

1. An in-cell touch panel comprising a top substrate and a bottom substrate disposed oppositely to each other, a common electrode layer disposed on a side of the bottom substrate that faces the top substrate, a touch sensing chip, a plurality of wires configured for connecting self-capacitance electrodes to the touch sensing chip, and a plurality of metal wires disposed on a same layer as and insulated from the wires; wherein, the common electrode layer comprises a plurality of independent self-capacitance electrodes;

the touch sensing chip is configured to apply common electrode signals to self-capacitance electrodes in a display interval and determine a touch position by detecting capacitance value variation of self-capacitance electrodes in a touch interval; and the metal wires and the wires are correspondingly in same straight lines and respectively connected in parallel with the self-capacitance electrodes overlapping with them.

2. The in-cell touch panel of claim 1, wherein the wires and the self-capacitance electrodes are disposed on different layers.

3. The in-cell touch panel of claim 2, further comprising: a black matrix layer disposed on a side of the top substrate facing the bottom substrate or on a side of the bottom substrate facing the top substrate; wherein orthogonal projections of patterns of the wires on the bottom substrate are all within a region in which a pattern of the black matrix layer is located; and orthogonal projections of gaps between adjacent two of the self-capacitance electrodes on the bottom substrate are all within the region in which the pattern of the black matrix layer is located.

4. The in-cell touch panel of claim 2, further comprising: a pixel electrode layer disposed on a side of the bottom substrate that faces the top substrate and disposed on a different layer from the common electrode layer; wherein, a layer on which the wires are located is provided between the pixel electrode layer and the common electrode layer.

5. The in-cell touch panel of claim 2, further comprising: gate signal lines and data signal lines intersecting each other and disposed on a side of the bottom substrate that faces the top substrate, wherein adjacent two gate signal line and adjacent two data signal line enclose a pixel; and
an extension direction of the wires is same as the gate signal lines or the data signal lines.

6. The in-cell touch panel of claim 5, wherein every two adjacent rows of pixels constitute a pixel group and two gate signal lines for providing gate scanning signals for these two rows of pixels are provided between these two rows of pixels; and
the wires are disposed at gaps between adjacent pixel groups and on a same layer as the gate signal lines.

7. The in-cell touch panel of claim 5, wherein two gate signal lines are provided between adjacent rows of pixels; and every two adjacent columns of pixels as one pixel group share one data signal line between these two columns of pixels; and
the wires are disposed at gaps between adjacent pixel groups and on a same layer as the data signal lines.

8. The in-cell touch panel of claim 1, further comprising: a black matrix layer disposed on a side of the top substrate facing the bottom substrate or on a side of the bottom substrate facing the top substrate; wherein
orthogonal projections of patterns of the wires on the bottom substrate are all within a region in which a pattern of the black matrix layer is located; and
orthogonal projections of gaps between adjacent two of the self-capacitance electrodes on the bottom substrate are all within the region in which the pattern of the black matrix layer is located.

9. The in-cell touch panel of claim 8, further comprising: a pixel electrode layer disposed on a side of the bottom substrate that faces the top substrate and disposed on a different layer from the common electrode layer; wherein,
a layer on which the wires are located is provided between the pixel electrode layer and the common electrode layer.

10. The in-cell touch panel of claim 8, further comprising: gate signal lines and data signal lines intersecting each other and disposed on a side of the bottom substrate that faces the top substrate, wherein adjacent two gate signal line and adjacent two data signal line enclose a pixel; and
an extension direction of the wires is same as the gate signal lines or the data signal lines.

11. The in-cell touch panel of claim 10, wherein every two adjacent rows of pixels constitute a pixel group and two gate signal lines for providing gate scanning signals for these two rows of pixels are provided between these two rows of pixels; and
the wires are disposed at gaps between adjacent pixel groups and on a same layer as the gate signal lines.

12. The in-cell touch panel of claim 10, wherein two gate signal lines are provided between adjacent rows of pixels; and every two adjacent columns of pixels as one pixel group share one data signal line between these two columns of pixels; and
the wires are disposed at gaps between adjacent pixel groups and on a same layer as the data signal lines.

13. The in-cell touch panel of claim 1, further comprising: a pixel electrode layer disposed on a side of the bottom substrate that faces the top substrate and disposed on a different layer from the common electrode layer; wherein,
a layer on which the wires are located is provided between the pixel electrode layer and the common electrode layer.

14. The in-cell touch panel of claim 1, further comprising: gate signal lines and data signal lines intersecting each other and disposed on a side of the bottom substrate that faces the top substrate, wherein adjacent two gate signal line and adjacent two data signal line enclose a pixel; and
an extension direction of the wires is same as the gate signal lines or the data signal lines.

15. The in-cell touch panel of claim 14, wherein every two adjacent rows of pixels constitute a pixel group and two gate signal lines for providing gate scanning signals for these two rows of pixels are provided between these two rows of pixels; and
the wires are disposed at gaps between adjacent pixel groups and on a same layer as the gate signal lines.

16. The in-cell touch panel of claim 14, wherein two gate signal lines are provided between adjacent rows of pixels; and every two adjacent columns of pixels as one pixel group share one data signal line between these two columns of pixels; and
the wires are disposed at gaps between adjacent pixel groups and on a same layer as the data signal lines.

17. A display device comprising the in-cell touch panel of claim 1.

* * * * *